United States Patent [19]

Hack

[11] 4,346,413

[45] Aug. 24, 1982

[54] MAGNETIC HEAD POSITIONING SERVO ARRANGEMENT FOR A SYSTEM FOR RECORDING/REPRODUCING INFORMATION ON A MAGNETIC RECORDING MEDIUM, PARTICULARLY ON A FLEXIBLE MAGNETIC RECORDING MEDIUM

[75] Inventor: Joachim Hack, Ludwigshafen, Fed. Rep. of Germany

[73] Assignee: BASF Aktiengesellschaft, Ludwigshafen, Fed. Rep. of Germany

[21] Appl. No.: 160,219

[22] Filed: Jun. 17, 1980

[30] Foreign Application Priority Data

Jul. 13, 1979 [DE] Fed. Rep. of Germany ....... 2928311

[51] Int. Cl.$^3$ .......................... G11B 5/00; G11B 21/10
[52] U.S. Cl. ......................................... 360/77; 360/78
[58] Field of Search ..................... 360/77, 78, 134–136

[56] References Cited

U.S. PATENT DOCUMENTS 3,185,972  5/1965  Sippel ................................. 360/109
4,074,328  2/1978  Hardwick ............................. 360/77
4,084,201  4/1978  Hack et al. ......................... 360/135
4,157,576  6/1979  Hack et al. ........................... 360/77
4,157,577  6/1979  Porter et al. ........................ 360/77
4,209,810  6/1980  Ragle et al. .......................... 360/77

Primary Examiner—John H. Wolff
Attorney, Agent, or Firm—Keil & Witherspoon

[57] ABSTRACT

A magnetic head positioning servo arrangement for a system for recording or reproducing information on a flexible magnetic recording medium, the position of the head being adjustable, relative to the magnetic tracks of the recording medium, by means of an actuator, and each magnetic track being provided with at least one reference signal which, when sensed, provides information about the momentary position of the head and, in the case of mistracking, generates in a comparator circuit a control signal for the actuator which moves the magnetic head back over the center of the track, the reference signal consisting of at least one pair of pulse sequences which are recorded asymmetrically with respect to the center of the track and which, when sensed, produce increasing or decreasing signal pulses.

12 Claims, 16 Drawing Figures

MAGNETIC HEAD POSITIONING SERVO ARRANGEMENT FOR A SYSTEM FOR RECORDING/REPRODUCING INFORMATION ON A MAGNETIC RECORDING MEDIUM, PARTICULARLY ON A FLEXIBLE MAGNETIC RECORDING MEDIUM

The present invention relates to a magnetic head positioning servo arrangement for a system for recording/reproducing information on a magnetic recording medium, particularly on a flexible magnetic recording medium, the position of the head being adjusted, relative to the magnetic tracks of the recording medium, by means of an actuator, and at least one reference signal being recorded within or beneath each magnetic track, which signal, when sensed, provides information about the momentary position of the head, this information being compared, in a comparator circuit, with information about the correct position of the head above the track center, and if there is a difference, a control signal is generated for the actuator which moves the magnetic head back to its correct position, and a magnetic recording medium for effecting head position control.

German Laid-Open Application DOS 2,439,546 discloses a servo arrangement for positioning the magnetic head in a data storage system in which servo information is recorded adjacent to or in the data track and is read by means of part of the data head or of a separate servo head and used for controlling the head position during read/write operations.

It is also known that in a magnetic disk storage system, in which the recording surface of the magnetic disk is divided into sectors, separate servo signals for each track may be stored in each sector and used for adjusting the radial position of the magnetic head. This servo information is recorded after the magnetic disk has been manufactured and normally remains stored unchanged for the life of the disk. In particular, the known servo signals (German Laid-Open Application DOS 2,619,601) in the sectors provide information about the excentricity and changes in shape of the magnetic disk. The servo recordings known hitherto are either too complicated or technically unsatisfactory.

German Published Application DAS 1,424,516 generally describes transducer positioning control signals which, like the data signals, are recorded diagonally to the track and are sensed with the same magnetic head. The signals are recorded diagonally for the purpose of eliminating guard bands between adjacent tracks, i.e. the tracks lie immediately next to one another, alternate tracks being recorded diagonally in opposite directions. However, it is disadvantageous that, in practice, the servo signals do not differ substantially from the data signals.

It is an object of the present invention to shape the servo signals in such a manner that simple detection of a mistracking condition and immediate and accurate head readjustment is achieved.

According to the invention, this object is achieved by a magnetic head positioning servo arrangement for a system for recording/reproducing information on a magnetic recording medium, particularly a flexible magnetic recording medium, the position of the head being adjustable, relative to the magnetic tracks of the recording medium, by means of an actuator, and at least one reference signal being recorded within or beneath each magnetic track, which signal, when sensed, provides information about the momentary position of the head, this information being compared, in a comparator circuit, with information about the correct position of the head above the track center, and, if there is a difference, a control signal is generated for the actuator which moves the magnetic head back to its correct position, wherein the reference signal consists of at least one pair of pulse sequences which are recorded asymmetrically with respect to the center of the track and which, when sensed, produce increasing or decreasing signal pulses, the individual pulses of the sensed signal being detected and compared by means of a comparator circuit, and a control signal for the actuator being generated in the event of a difference in signals.

Such a reference signal, the shape of which is allocated to the sensing location, can be detected reliably and without difficulty and can be converted in a simple manner into the control signal and thus makes possible immediate head readjustment.

In an advantageous embodiment, the waveform of each pulse sequence of the reference signal is triangular, this being a signal shape which can be readily detected.

In a further embodiment of the invention, the pair of pulse sequences consists of a pulse pattern on the track, this pattern having a marker zone, at least part of which extends diagonally across the track. As a result, the reference signals can be produced in a very simple manner.

On the one hand, such a marker zone, which may for example be triangular or strip-shaped, can be produced by partially erasing the pulse pattern. On the other hand, the marker zone can also be formed by a pulse pattern between neighboring areas which are erased diagonally to the track. Such marker zones can also be produced by overwriting a pulse pattern or by removing correspondingly shaped areas of the magnetic layer.

In a further advantageous embodiment of the invention, the first pulse sequence is recorded on one half of the track and the second pulse sequence on the other half, the second pulse sequence being arranged behind the first pulse sequence in the direction of recording and both pulse sequences having the same waveform.

Advantageously, the comparator circuit is a summing circuit in which the pulses of the first sequence are stored and the pulses of the second sequence are removed. In practice, the summing circuit can be in the form of a counter which is incremented by the pulses of the first sequence and decremented step by step by the pulses of the second sequence.

It is advantageous, with a view to achieving as faultless a signal reading operation as possible, to provide several pairs of pulse sequences on each magnetic track. If an optimum number of reference signals is used, for example on each track of a flexible recording disk, it is possible to effect continuous automatic control of the material-dependent changes in the shape of the disk by using an automatic head positioning device so that both write and read operations can be carried out without being affected by these changes.

The invention also relates to a magnetic recording medium, particularly a flexible magnetic recording medium, for effecting head position control, which consists of a base provided with a magnetic layer and possessing, in this layer, signals which are to be or are recorded on a plurality of tracks, wherein said magnetic track comprises at least one reference signal having at least one area, at least part of which extends diagonally across the track, and which is magnetically different from the areas adjoining it.

As explained above, the areas of the reference signal can be of any suitable shape; for example, magnetic erasure of a strip-shaped or triangular region is considered to be a very favorable method of producing these areas.

In order to cover, for the purpose of head position control, as much of the total area of the recording medium as possible, it is advantageous if a plurality of reference signals are provided on each track.

With the abovementioned use of a plurality of such reference signals on one track—whether it be a longitudinal track on a magnetic tape or a circular track on a rigid or flexible magnetic disk—a considerable increase in the storage capacity of the recording media can be achieved since the available recording surfaces can be utilized almost completely and the error rate due to poor head positioning can be kept very low.

Details of embodiments of systems having a head positioning servo arrangement according to the invention and a recording medium according to the invention are given in the following description, with reference to the accompanying drawings, in which.

Figure 2:
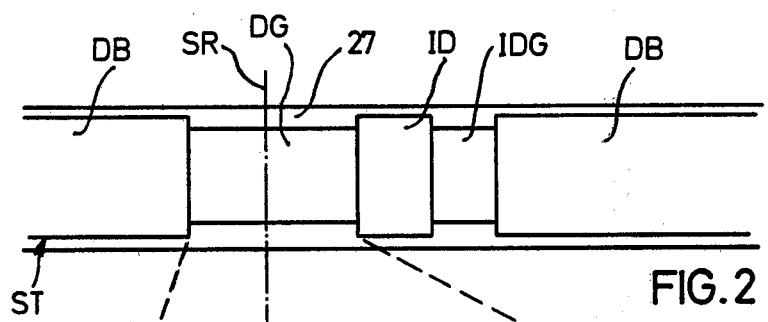
FIG. 2 shows the format of a recording track on a flexible magnetic disk.
Figure 2A:
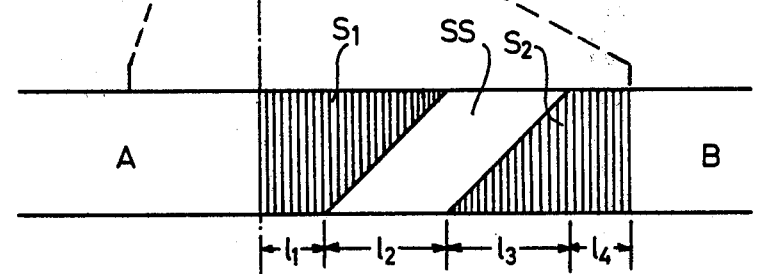
Figure 2B:
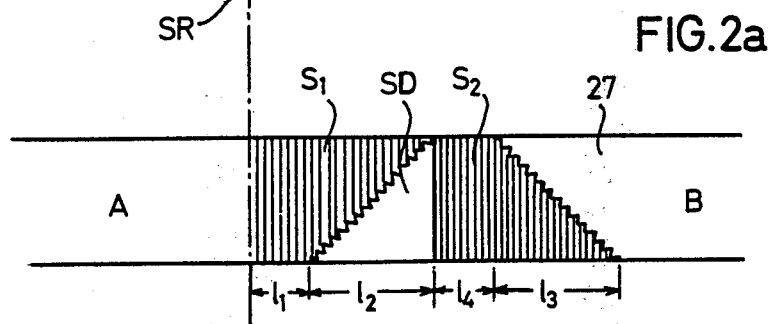
Figures 3A, 3B:
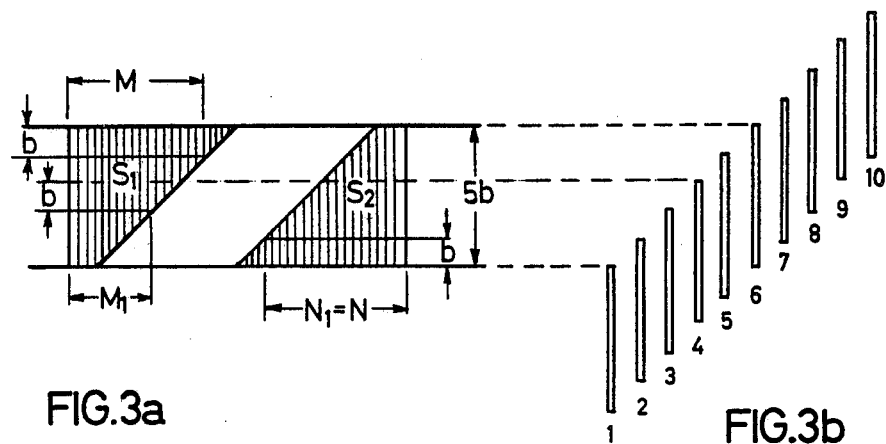
Figure 3C:
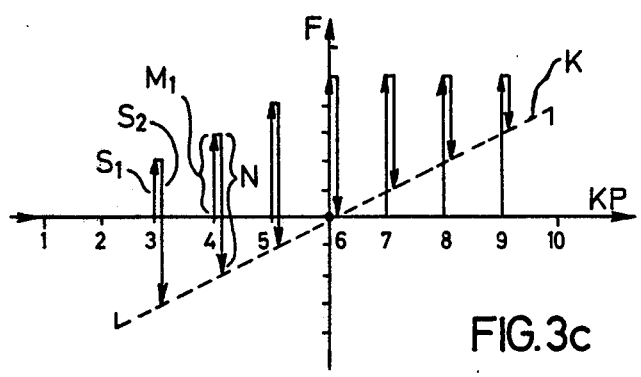
Figure 4:
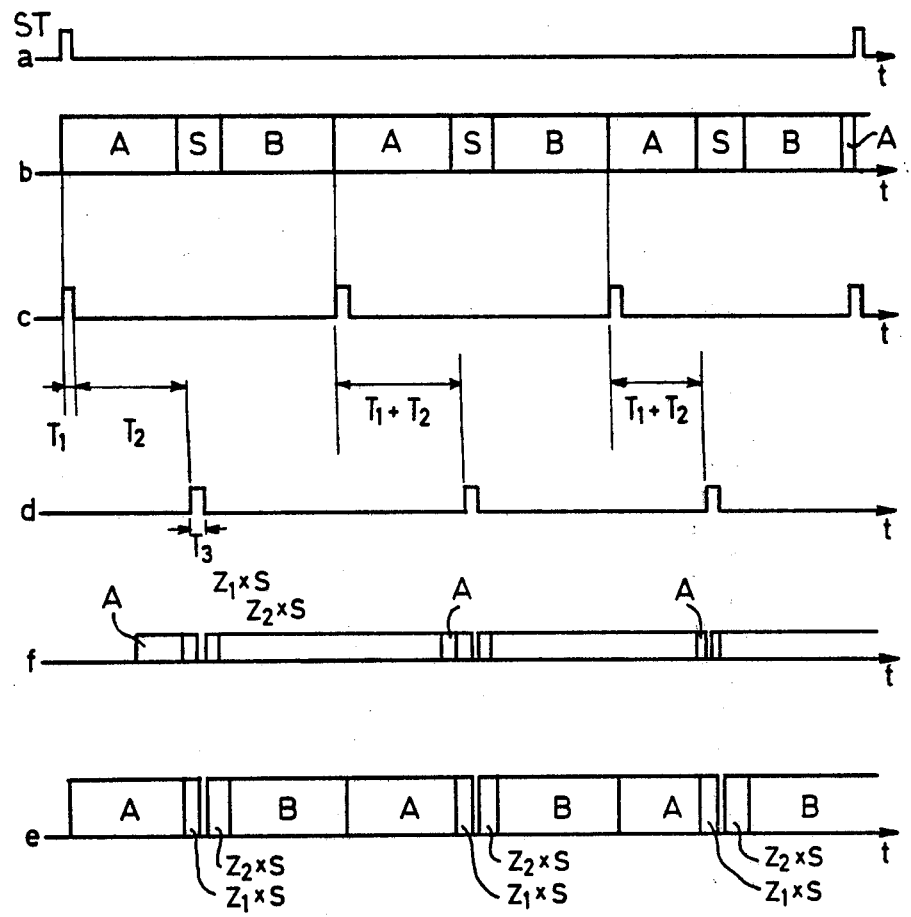
Figure 5:
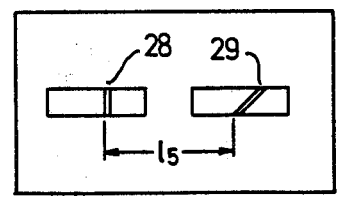
Figure 6:
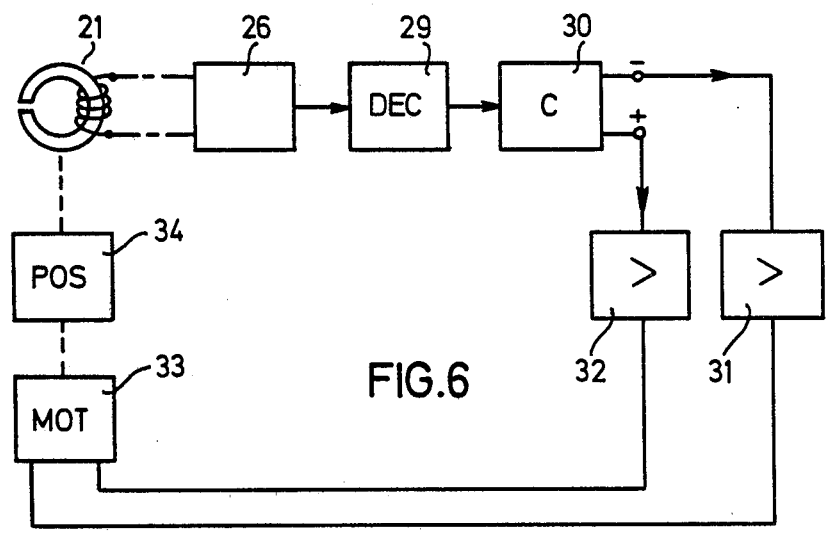
Figure 7A:
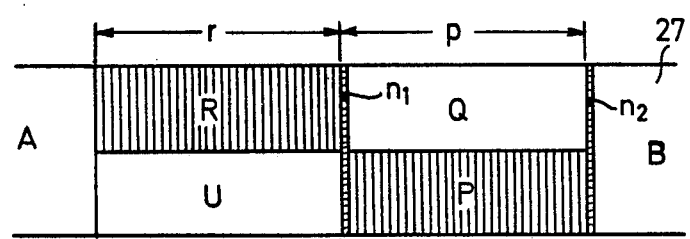
Figure 7B:
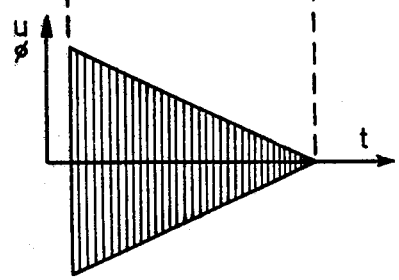

FIG. 2a shows part of the recording track of FIG. 2 containing servo information according to the invention, FIG. 2b shows a further form of servo information, partially consisting of staircase pulses, FIG. 3a shows servo information according to FIG. 2a, FIG. 3b shows a number of positions of the read head gap in relation to the servo information, FIG. 3c shows a number of the servo signals read as a function of different head gap positions according to FIG. 3b, FIGS. 4a–e show timing diagrams for initializing a recording medium with servo information according to the present invention, FIG. 5 shows an embodiment of a combined read/-write and servo head for initializing a recording medium, FIG. 6 shows a block diagram of an evaluation and automatic head position control circuit for the servo signals, FIG. 7a shows a variant of the servo information in spatial representation, and FIG. 7b shows one half of the servo information as a sensed electrical signal.

A data recording/reproducing system, in which the head positioning servo arrangement according to the invention and the magnetic recording medium according to the invention can be used, is described below, by way of example, with reference to a floppy disk drive.

Figure 1:
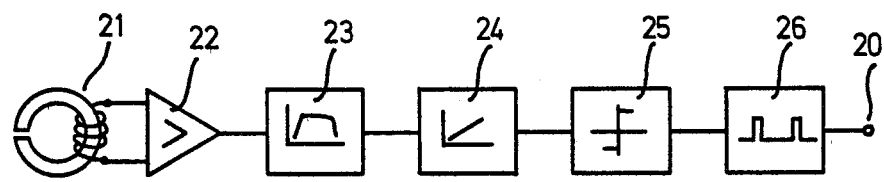
FIG. 1 shows the block diagram of the read circuit in a memory processing unit.

According to FIG. 1, the read channel of such a disk drive consists of the following stages:

Read head 21, read amplifier 22, noise suppression filter 23, differentiator 24, zero detector 25, pulse shaper 26 and output terminal 26. The read signal induced in the read head winding is thus amplified, low-frequency and high-frequency noise signals are removed by limiting the frequency range, and the user information signal, the information being contained in the position of the pulse spikes, is then differentiated so that the position of the pulse spikes is converted to zero crossovers. In the zero detector the differentiated signal is converted into a rectangular signal which is then converted into a sequence of narrow read pulses which are available at the output 20. During the generation of the rectangular signal, a minimum signal amplitude is set in order to obtain a read signal which is free of noise components. Thereafter, the signal amplitude is limited at approximately 1/10-⅓ of the maximum read amplitude in such a manner that only read pulses of higher amplitude are detected. In order to obtain such a minimum read pulse amplitude, a minimum read track width b (see FIG. 3a) is established. If this track width b is not achieved, the read pulse sequence at the output 20 no longer agrees with the recorded signal sequence.

A flexible magnetic disk (such as a Flexy Disk ® (trademark of BASF Aktiengesellschaft, 6700 Ludwigshafen, Germany) has data tracks with standardized formatting. A data track 27 has 26 sectors, each with a sector identification signal (ID) consisting of 13 bytes, an identification gap (IDG) consisting of 11 bytes and the data block (DB) consisting of 137 bytes and the data gap (DG) of 27 bytes. These format blocks are as shown in FIG. 2.

According to the present invention, in the data gap DG a reference signal for head position control is provided which does not in any way interfere with the data format. Initialization of a data track 27 can for example be carried out as follows. Triggered by a track start signal ST (FIG. 4a) which can be generated by an index mark or a fault on the magnetic disk, 80×A bytes, 30×S bytes and 78×B bytes are recorded continuously as sector identification signal with the read/write gap of, for example, a recording/playback head in FIG. 5. A, B and S bytes are here easily distinguishable signals, each of which has a predetermined pattern. After the last B bytes, A bytes are recorded until the next track start signal is detected. In the read operation, during the next revolution the recorded data patterns are detected and checked by means of the read channel of FIG. 1. As each signal transition from B to A bytes is detected, a delay generator is started for a period T1. After the time T1 has elapsed, the erase head as shown in FIG. 5 is supported with an erase current for the erasing period T3. Due to the distance l 5 between the read gap 28 and the inclined erase gap 29 (FIG. 5), a time delay T2 arises which, in conjunction with T1, controls the timing of the erase current in such a manner that it becomes effective only in the region of the S bytes. The S byte areas are partially erased by the inclined erase gap, as shown in FIG. 2a. With the period T2 predetermined by the distance between the head gaps 28 and 29, the period T1 is so adjusted that the length l 1 (FIG. 2a) has the optimum length for the particular format used (in the present embodiment, l 1=from 0 to 2 bytes). l 1 designates the distance between the sector reference line (SR), running approximately through the center of the data gap DG, and the beginning of the erased diagonal strip SS which represents an important characteristic of the servo signal according to the invention. The period T1 may also be easily varied from track to track so that the length l 1 can be maintained for all tracks—even with circular tracks of different lengths.

The erasing time T3 is advantageously such that an erased length l 2 (FIG. 2a) of approximately from 2 to 16 bytes is obtained. As determined by the sensitivity of the read circuit (FIG. 1), after this erasure the following information is still readable from the 30×S byte fields:

a number of $Z1 \times S$ bytes from length $l\,1$ and the still readable part of $l\,2$ a number of $Z2 \times S$ bytes from length $l\,4$ and the still readable part of $l\,3$.

As already noted above, the limit of readability can be adjusted to approximately from 1/10 to ⅓ of the normal amplitude of the data signals.

In FIG. 4e the information contents of a track obtained after diagonal erasure are represented.

During the next revolution of the magnetic disk the number (Z1) of the readable S bytes up to the diagonal strip SS is determined and then compared with the number of S bytes (Z2). If the head is in its nominal position, i.e. over the center of the track, agreement of the numbers $Z1=Z2$ is established so that the write operation can be started and the sector, consisting of sector identification signal ID, identification gap IDG and data block DB, is continuously initialized. After initialization of the sector, the write operation is stopped so that a few A bytes (approximately 9 bytes) are left until the subsequent S byte field is recognized. This procedure is repeated for every sector until all sectors are initialized (see FIGS. 4f and 3). The bytes written are selected under the aspect of distinguishability so that flux changes in the magnetic coating, which differ in space and time, are allocated to the A, B and S bytes.

The procedure for using a recording medium containing servo information as described above is as follows:

In FIG. 3a, a track 27 containing servo information as shown in FIG. 2a is represented. To the right of this FIG. 3a, FIG. 3b shows ten different positions of a read head cap 28. The minimum read track width of a signal, which can still be recognized as a decodable data signal, is b. In the embodiment described here, the total track width is 5b. If the track 27 is read with a read circuit according to FIG. 1 in an arbitrary head position (from 1 to 10 in FIG. 3b), a number of M1 bytes must be identified from the group of S1 bytes and a number of N1 bytes must be identified from the group of S2 bytes. If the read track is identical to the written track (head gap position 6) in FIG. 3b, $M1=M=N1=N$. M and N are not necessarily identical to Z1 and Z2 as shown in FIG. 4 if different drives are used, since normally each amplifier chain has a different sensitivity, so that it must be considered to be an advantage that the sensitivity of the amplifier does not affect the head position control signal.

If the S1, S2 signal patterns in FIG. 3 are read with a read head position corresponding to head position 4 in FIG. 3b, only a number of M1 bytes of the S1 signal pattern are recognized, and from the S2 signal pattern only a number of $N1=N$ bytes are recognized. From the difference $F=M1-N1$ of the bytes read, a line K according to FIG. 3c can be determined, each of the possible read head positions (KP) (from 1 to 10) in FIG. 3b being associated with S2 bytes. Head deviation from the center line of the written track, the position of the latter being fixed by the initialization, is proportional to the difference $F=M1-N1$ (in this embodiment, head position 4, FIG. 3c), and the direction of the deviation is defined by the sign of the difference. If the M1 and N1 byte numbers are fed to an electronic counter circuit, so that the M1 bytes increment the counter and the N1 bytes decrement the counter step by step, the result is a number of $F=M1-N1$ bytes which represents the head deviation and which can now be utilized by means of known circuits for correcting the position of the read head.

Such a circuit is shown diagrammatically in FIG. 5. In this circuit, the read head 21 is followed by the pulse-shaping stage 26, a decoder (DEC) 29 for the S bytes and a counter circuit, symbolized by a flip-flop 30, which should have a negative and positive output. In a conventional manner, a direct-current servo motor (MOT) 33 is controlled via D/A convertors, which are not shown, and subsequent separate amplifiers 31 and 32, this servo motor, in turn, controlling a positioning device (POS) 34 for the read head 1, for example within 3 msec. The position of the read head 21 is adjusted by means of suitable devices, for example directly by means of the head positioner of the drive used.

The decoder DEC 29 recognizes the A, B or S byte types of information and detects the data transitions. There is no response if a first S signal pattern is followed by an A or B signal pattern since, for example, faulty information may be present. If a first S signal pattern is followed by a second S pattern, the S signals are added, for example by means of the counter C, up to a predetermined pause or until the signal readability limit is reached again, and after the pause, or when the signal readability limit has been reached again, the counter is decremented step by step by the subsequent S signals, i.e. the subsequent S signals (Z2) are substracted.

The steps for effecting servo initialization of a magnetic recording medium and the control of the position of the read head, including the compensation procedure for a possible head alignment error, have been described above. The essential component of the servo information is an area SS or SD, at least part of which extends diagonally across the track and the magnetization of which differs from that of the neighboring areas, different electric pulse patterns thus being produced when these areas are sensed.

The strip SS or the triangle SD can be a magnetically erased area within a predetermined fixed pulse pattern or a written area within an erased area. The strip SS can also be an area which has been overwritten with a signal, or area SS or SD can be an area on the magnetic recording medium, a correspondingly shaped portion of whose magnetic layer has been removed. If the servo information is to be initialized by the user, a magnetically erased strip or, for example, a triangular area which can differ from device to device is to be preferred to a permanent marking; otherwise, it is preferable for the servo information to be initialized by the manufacturer.

The strip SS or the inclined line of triangular area SD can run, for example, at an angle of approximately 20° to 70° to the transverse axis of the track.

The edges of the strip SS may be straight, as shown in FIGS. 2a and 3a, or step-shaped (FIG. 2b), the latter shape being produced by step-by-step erasure with the read/write gap at head gap positions which differ from track section to track section (as shown in FIG. 3b). For example, this read/write head displacement relative to the track can be achieved by means of a head stepping device, the individual steps of which are fractions of the track width.

A further type of servo information according to the invention is shown in FIG. 7a. Here, the magnetized areas R and P are arranged in staggered relationship on either side of the center of the track, being merely separated by a narrow erased guard band n1. Such a magnetic signal produces a read signal as shown in FIG. 7b, the amplitudes of each signal area R and P decreasing continuously from their maxima to zero. Such a decrease in amplitude can be produced during initialization of a recording medium by appropriately changing the amplitude of the write current, by effecting erasure at an angle as described above, or by switching the write current on and off at irregular intervals to give different distances between flux changes. The areas Q and U are advantageously erased magnetically.

The servo signals shown in FIG. 7 can be produced in the following manner, explained with reference to a magnetic track on a flexible magnetic disk.

1. Erase disk. Set head to nominal track position.
2. Use write head 2 to write A bytes in nominal track position, then write 5 B bytes at a distance equal to r+p+n1+n2.
3. Set position of upper track half (approximately 180 μm displacement from the center line in the case of flexible magnetic disks). After reading 1 A byte, write the servo signal pattern in area R with decreasing amplitudes, using one of the processes specified; do not write in zone Q.
4. Set position of lower track half (approximately 180 μm displacement from the center line in the case of flexible magnetic disks). After reading 1 A byte, write the servo signal pattern after a delay time—corresponding to the distance r—in the area P with decreasing amplitudes, using one of the processes specified.
5. Set write head and tunnel erase head to nominal track position. Tunnel erase the entire track, thus producing the track width according to FIG. 7a.
6. With the head in its nominal track position, read servo signal patterns R and P, counting detectable numbers of pulses from R and P; if a predetermined difference between the numbers in exceeded, correct by new initialization.

The further measures, i.e. recording of data signals, reading and evaluation of servo signals and readjustment of the head position, can be carried out as described above.

With the present head positioning servo arrangement it is possible to detect head deviation from the ideal position any number of times within a magnetic track, and to correct the head position. In the case of flexible magnetic disks, i.e. floppy disks or FlexyDisks®, it is possible to achieve accurate head tracking up to an excentricity of 50 μm during one revolution of the disk, the head position being readjusted 26 times per track. The necessary initialization of disks or magnetic tape can be carried out either by the manufacturer or later by the user. Apart from reducing the error rate in data storage using flexible recording media, it is possible to at least triple the track density of, for example, FlexyDisks®.

I claim:

1. A magnetic head positioning servo arrangement for a system for recording/reproducing information on a magnetic recording medium, particularly on a flexible magnetic recording medium, the position of the head being adjustable, relative to the magnetic tracks of the recording medium, by means of an actuator, and at least one reference signal being recorded within or beneath each magnetic track, which signal, when sensed, provides information about the momentary position of the head, this information being compared, in a comparator circuit, with information about the correct position of the head above the track center, and, if there is a difference, a control signal is generated for the actuator which moves the magnetic head back to its correct position,
    wherein the reference signal consists of at least one pair of pulse sequences, said pulse sequences
    being recorded asymetrically with respect to the center of said track,
    consisting of a pulse pattern on said track having a signal free marker zone which is produced by partially erasing the pulse pattern and at least part of which extends diagonally across said track, and,
    when sensed, producing increasing and decreasing signal pulses,
    the individual pulses of the sensed signal being detected and compared by means of a comparator circuit, and a control signal for the actuator being generated in the event of a difference in signals.

2. A magnetic head positioning servo arrangement as claimed in claim 1, wherein the marker zone is formed by a pulse pattern between neighboring areas erased diagonally to the track.

3. A magnetic head positioning servo arrangement for a system for recording/reproducing information on a magnetic recording medium, particularly on a flexible magnetic recording medium, the position of the head being adjustable, relative to the magnetic tracks of the recording medium, by means of an actuator, and at least one reference signal being recorded within or beneath each magnetic track, which signal, when sensed, provides information about the momentary position of the head, this information being compared, in a comparator circuit, with information about the correct position of the head above the track center, and, if there is a difference, a control signal is generated for the actuator which moves the magnetic head back to its correct position,
    wherein the reference signal consists of at least one pair of pulse sequences, said pulse sequences
    being recorded asymetrically with respect to the center of said track,
    consisting of a pulse pattern on said track having a distinct marker zone which is produced by overwriting the pulse pattern and at least part of which extends diagonally across said track, and,
    when sensed, producing increasing and decreasing signal pulses,
    the individual pulses of the sensed signal being detected and compared by means of a comparator circuit, and a control signal for the actuator being generated in the event of a difference in signals.

4. A magnetic head positioning servo arrangement for a system for recording/reproducing information on the data tracks of a magnetic recording medium, particularly a flexible magnetic recording medium, the position of the head being adjustable relatively to said tracks by means of an actuator,
    wherein reference signals in the form of at least one pair of pulse sequences are recorded along, asymetrically with respect to the center of, and transversely within the confines of the width of each data track, the signals of said pair being of a kind producing, upon sensing, increasing and decreasing signal pulses, respectively, and
    wherein there are provided means for comparing the individual pulses of the two sequences and, in the event of a difference due to a deviation from the center of said track, generating a control signal for the actuator, which causes the magnetic head to be moved back to its central position.

5. A magnetic head positioning servo arrangement as claimed in claim 4, wherein the waveform of each pulse sequence of the reference signal is triangular.

6. A magnetic head positioning servo arrangement as claimed in claim 4, wherein the first pulse sequence is recorded on one half of the track, and the second pulse sequence is recorded behind the first pulse sequence, in the direction of recording, on the other half of the track, both pulse sequences having the same waveform.

7. A magnetic head positioning servo arrangement as claimed in claim 4, wherein the comparator circuit is a summing circuit in which the pulses of the first sequence are stored and the pulses of the second sequence are removed.

8. A magnetic head positioning servo arrangement as claimed in claim 7, wherein the summing circuit is a counter which is incremented by the pulses of the first sequence and decremented step by step by the pulses of the second sequence.

9. A magnetic head positioning servo arrangement as claimed in any one of claims 4, 5, 6, 7 or 8, wherein several pairs of pulse sequences are provided on each magnetic track.

10. A magnetic recording medium, particularly a flexible magnetic recording medium, which consists of a base provided with a magnetic layer and carries, in said layer, signals which are to be recorded, or are recorded, on a plurality of data tracks, for use with a magnetic head positioning servo arrangement in which arrangement the head is adjustable relatively to said tracks by means of an actuator, reference signals in the form of at least one pair of pulse sequences are recorded, asymmetrically with respect to the center of, and transversely within the confines of the width of, each data track, the signals of each pair being of a kind producing, upon sensing, increasing and decreasing signal pulses, respectively, and there are provided means for comparing the individual pulses of the two sequences and, in the event of a difference due to a deviation from the center of said track, generating a control signal for the actuator, which causes the magnetic head to be moved back to its central position, each of said magnetic tracks including at least one reference signal having at least one area, at least part of which extends diagonally across the track, and which is magnetically different from the areas adjoining it.

11. A recording medium as claimed in claim 10, wherein the said area is erased magnetically.

12. A recording medium as claimed in claim 10 or 11, wherein a plurality of reference signals are provided on each track.

* * * * *

UNITED STATES PATENT AND TRADEMARK OFFICE
CERTIFICATE OF CORRECTION

PATENT NO. : 4,346,413
DATED : August 24, 1982
INVENTOR(S) : Joachim Hack

It is certified that error appears in the above-identified patent and that said Letters Patent are hereby corrected as shown below:

Claim 12, line 2, cancel "on" and substitute

--- lengthwise of ---.

Signed and Sealed this

Ninth Day of November 1982

[SEAL]

Attest:

GERALD J. MOSSINGHOFF

Attesting Officer    Commissioner of Patents and Trademarks